United States Patent [19]

Pichelman

[11] E Patent Number: Re. 31,745

[45] Reissued Date of Patent: Nov. 27, 1984

[54] COMPOSITE BRUSH

[75] Inventor: Franklin D. Pichelman, Minnetonka, Minn.

[73] Assignee: Flo-Pac Corporation, Minneapolis, Minn.

[21] Appl. No.: 431,305

[22] Filed: Sep. 30, 1982

Related U.S. Patent Documents

Reissue of:

[64] Patent No.: 4,305,234
Issued: Dec. 15, 1981
Appl. No.: 118,508
Filed: Feb. 4, 1980

[51] Int. Cl.[3] ..... B24D 13/14; A46B 9/06

[52] U.S. Cl. ..... 51/330; 15/180; 15/DIG. 6; 51/358; 51/400

[58] Field of Search ..... 15/159 A, 179–183, 15/198–200, DIG. 6, DIG. 5; 51/394, 330, 397, 358, 400

[56] References Cited

U.S. PATENT DOCUMENTS

| | | | |
|---|---|---|---|
| 430,077 | 6/1890 | Jenness . | |
| 1,142,698 | 6/1915 | Grove et al. . | |
| 1,958,658 | 5/1934 | Engberg et al. . | |
| 1,979,240 | 11/1934 | Adelmann | 15/159 A |
| 2,328,998 | 9/1943 | Radford . | |
| 3,047,897 | 8/1962 | Bartos et al. . | |
| 3,114,925 | 12/1963 | Charvat . | |
| 3,128,487 | 4/1964 | Vallis . | |
| 3,147,503 | 9/1964 | Charvat | 15/180 X |
| 3,181,193 | 5/1965 | Nobles et al. . | |
| 3,290,713 | 12/1966 | Barry . | |
| 3,605,347 | 9/1971 | Barry | 51/400 X |
| 4,037,369 | 7/1977 | Campbell | 15/159 A X |

FOREIGN PATENT DOCUMENTS

| | | | |
|---|---|---|---|
| 1134245 | 11/1956 | France | 15/DIG. 6 |
| 309419 | 4/1929 | United Kingdom | 15/159 A |

OTHER PUBLICATIONS

Zimco Specification Sheet, Form #100.

Zimmerman Brush Co. Brochure ZFL-613, and Catalog Page ZFL-612.

*Primary Examiner*—Peter Feldman

*Attorney, Agent, or Firm*—James R. Haller

[57] ABSTRACT

A brush suitable for use with floor maintenance equipment and having both abrasive nonabsorbent bristles and nonabrasive absorbent bristles. The bristles are fairly evenly intermingled in each tuft, and the brush includes a plurality of tufts such that the brush face presents a substantially intermingled mix of both bristles. To enhance the cleaning qualities of the brush, the percentage of abrasive nonabsorbent bristles may be increased. To enhance the finish applying and buffing qualities of the brush, the percentage of nonabrasive absorbent bristles may be increased.

4 Claims, 3 Drawing Figures

COMPOSITE BRUSH

Matter enclosed in heavy brackets [ ] appears in the original patent but forms no part of this reissue specification; matter printed in italics indicates the additions made by reissue.

TECHNICAL FIELD

This invention relates generally to floor maintenance equipment and more particularly to brushes.

BACKGROUND ART

Floor maintenance activities generally include cleaning, applying a new finish, and buffing and polishing the newly applied finish. Generally, a more abrasive cleaning element will be used to clean the floor of dirt, scuff marks and to remove any old finishes, and less abrasive cleaning elements will be used to apply, buff, and polish the new finish.

To perform these cleaning activities, persons skilled in the art have relied upon a graduated system of cleaning pads. These pads range in degree of abrasiveness, and are used with floor cleaning machines that rotate the pads while urging the pad against the floor. Properly used, such pads serve well to carry out the various cleaning activities outlined above.

Unfortunately, such pads are inconvenient in many respects and are also relatively costly. In particular, each pad must be properly centered on the floor cleaning machine or the pad may bunch up, tear or become damaged in some other way. Since the pad must be reversed and exchanged quite often during a typical cleaning operation, continually ensuring proper orientation of the pad can be time consuming. Pads are also ill-suited for use on floors having low obstacles such as phone line conduit and the like over which the cleaning implement should pass. If not carefully moved over such an obstacle, the pad may tear, bunch up or become uncentered.

More importantly, scrubbing and buffing pads quickly lose their abrasive qualities. During each use, the pad will lose many small embedded particles that impart the abrasive character, and therefore cause the pad to become less suitable for its original intended purpose. Furthermore, the abrasive particles lost by the pad create a maintenance problem, and the operator must generally dust mop a pad scrubbed area to remove such particles.

Finally, pads become dirty and clog quickly, and the operator must utilize time-consuming cleaning techniques to prepare the pads for use again. This usually requires both washing machines and drying racks or the like.

In part because of the problems identified above, persons skilled in the art have also used brushes that are similarly usable with floor cleaning machines. Some brushes in the prior art have a brush face comprised of bristles alone, and some provide for a combination of both bristles and cleaning pads or the like, such as those depicted in U.S. Pat. Nos. 3,290,713 and 3,181,193.

Unfortunately, these prior art brushes are generally only useful for scrubbing. Although some attempts have been made to provide a brush useful for buffing activities, these attempts have failed to provide a brush capable of buffing in a manner comparable to a new pad buffing, and the industry has continued to predominantly rely upon the pad system of floor maintenance for spray buffing and light scrubbing.

A need therefore exists for a cleaning device that will scrub and buff a floor in a manner comparable to the performance of a buffing pad, but that substantially avoids the relative inconveniences and costliness of pads.

DISCLOSURE OF INVENTION

The invention disclosed herein is directed to a brush usable with floor maintenance equipment that has both abrasive and polishing qualities, such that it may be used to scrub a floor and to both apply and buff a new finish.

To allow the brush to be generally usable with existing floor maintenance equipment, the brush has a circular-shaped base plate having a hole disposed axially therethrough for facilitating attachment to the floor cleaning mechanism. The base also includes a number of tuft cavities disposed on its under surface for receiving tufts of bristles.

The brush also includes a number of tufts of bristles deposited within the tuft cavities provided in the base. Each tuft may be comprised of a mixture of Dupont's Tynex A and tampico, and bristles having similar qualities. Tynex A is an abrasive and nonabsorbent synthetic fiber comprised of a nylon filament having abrasive particles such as silicon carbide, aluminum oxide, or pumice impregnated therein. Tampico is a nonabrasive and absorbent natural fiber made from plant materials. To form a tuft, the bristles are substantially evenly intermingled with one another, and then bent at their middle as an integral unit around a staple. The tuft may then be placed in a tuft cavity and the staple may be driven into the base to secure the tuft nonyieldingly thereto.

By increasing the percentage of Tynex A in each tuft, the abrasive and nonabsorvent qualities of the brush will be increased. Similarly, by increasing the percentage of tampico in each tuft, the nonabrasive and water-absorbing qualities of the brush will be enhanced. The applicant has determined that to provide a brush capable of substantially removing scuff marks and the like while simultaneously spreading and buffing a new finish across a work surface without streaking, a mixture of 70% Tynex A and 30% tampico works well.

The effectiveness of such a brush combined with a relatively long useful life that makes this brush a reasonable replacement for the buffing pads currently used in the industry. Furthermore, the brush requires no awkward positioning normally associated with pads, it won't tear, it need not be cleaned or exchanged during a cleaning operation, and it will move over low obstacles with ease. Perhaps most important, the brush will substantially retain its abrasive qualities over its entire useful life, until the bristles are worn down nearly to the base plate. Such a brush has been found to easily outlast over one hundred pads when used to perform similar maintenance activities. The use of this one brush will eliminate the need for a multiplicity of devices currently used to provide substantially the same performance.

BRIEF DESCRIPTION OF THE DRAWINGS

These and other features of the invention will become more apparent upon reference to the following description of the best mode for carrying out the invention, and in particular upon referring to the drawings, wherein.

BEST MODE FOR CARRYING OUT THE INVENTION

Figure 1:
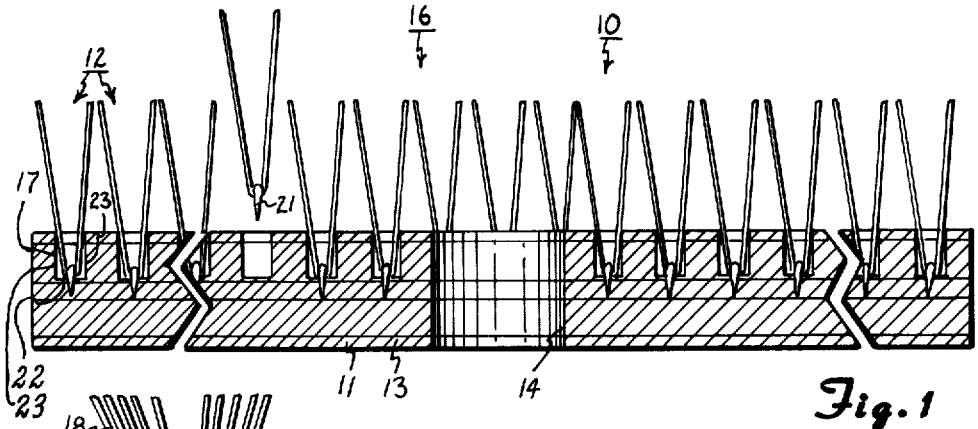
FIG. 1 is a cross-sectioned view of the brush.

Referring now to the drawings, and in particular to FIG. 1, the apparatus of the invention may be seen as denoted generally by the numeral 10. The apparatus (10) includes generally a base unit (11) and a plurality of tuft units (12).

The base unit (11) consists of a circular-shaped plate (13) having a hole (14) disposed axially therethrough for facilitating attachment of the apparatus (10) to a floor maintenance mechanism (not shown). The base unit (11) may be constructed of laminated plywood or some other material suitable for use in the operating environment of floor maintenance brushes.

One side of the base unit (11) comprises the brush face (16) and has a plurality of tuft cavities (17) formed therein for receiving individual tuft units (12). In general, each such tuft cavity (17) will be cylindrically shaped and may be suitably formed by the use of a drill. The number and size of such tuft cavities (17) will to some extent be dictated by the bristle density required by the operator.

Figure 2:
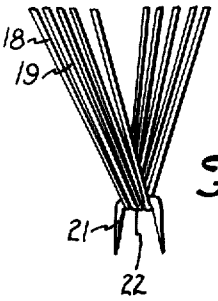
FIG. 2 is an enlarged side elevational view of a tuft unit.

Referring now to FIG. 2, a tuft unit (12) includes both Dupont Tynex A bristles (18) and tampico bristles (19) (or equivalent bristles) bent midway about a staple (21). The number of bristles per tuft unit (12) will depend to some extent upon the diameter of the tuft cavities (17) provided, and the desired bristle density. The Tynex A and tampico bristles (18 and 19) should be fairly evenly intermingled in each tuft unit (12).

Referring again to FIG. 1, the tuft unit (12) may be vertically disposed in a tuft cavity (17) and the staple (21) may be forced into the base unit (11). The staple (21) will nonyieldingly maintain the base (22) of the tuft unit (12) in place, and the walls (23) of the tuft cavity (17) will urge the bristles towards a substantially vertical orientation. The tuft units (12) could, of course, be attached to the base unit (11) by other means as well, such as by the crimp and channel method.

Figure 3:
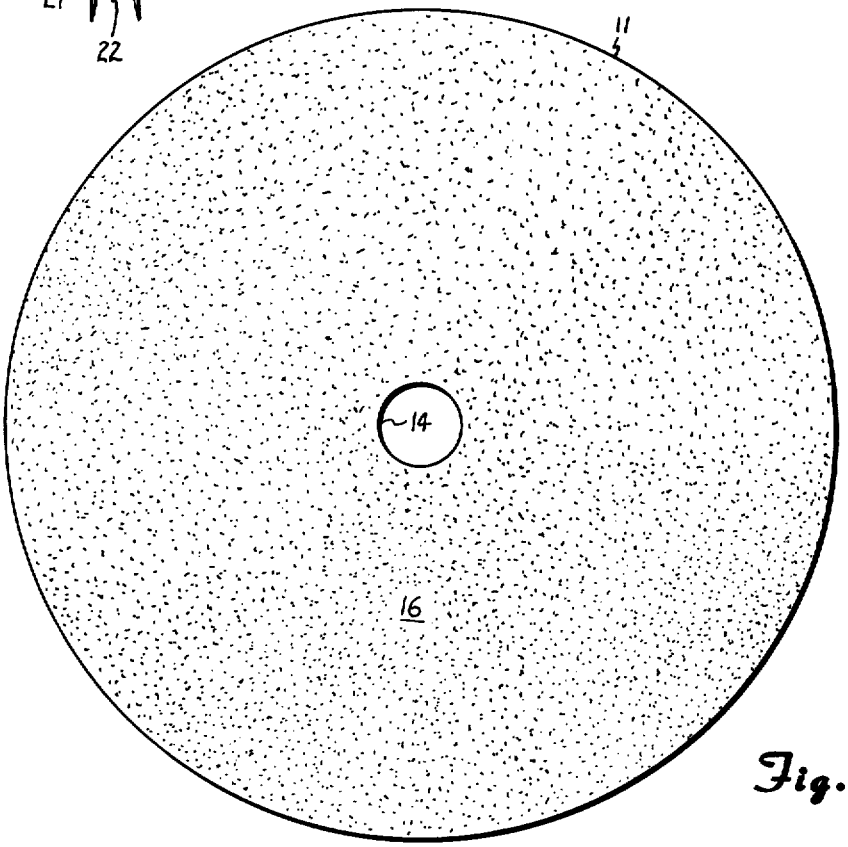
FIG. 3 is a top plan view of the brush.

When all the tuft units (12) are in place on the base unit (11) the brush face (16) presents a fairly uniform mat of bristles as depicted in FIG. 3. Since the Tynex A and tampico bristles (18 and 19) are fairly evenly distributed in each tuft unit (12), the Tynex A and tampico bristles (18 and 19) will be substantially evenly intermingled as viewed across the entire brush face (16).

To use the apparatus (10), the operator need only attach the base unit (11) to an appropriate floor maintenance mechanism. This mechanism will cause the base unit (11) to revolve about its central axis such that the bristles (18 and 19) will move over and interact with the floor surface. The operator may then spray a finish solution on the floor to be worked. Such a solution will generally be mixed one part water to one part finish. The operator then maneuvers the revolving brush about the floor to spread the finish solution. The nonabsorbent and abrasive qualities for the Tynex A bristles (18) will facilitate the removal of scuff marks and the like from the floor. At the same time, the nonabrasive and absorbent qualities of the tampico bristles (19) will provide a wick action that will withdraw the water from the finish solution, and this, along with evaporation caused by heat retained by the tampico bristles (10), will cause an even spreading and application of the finish without streaking. Although the brush has abrasive qualities, the abrasion occurs at a slow rate over time, such that the brush also has a buffing action upon the newly applied finish.

This brush will therefore not only satisfactorily apply and buff a finish solution like a buffing pad, it will also perform cleaning function normally associated with a more generally abrasive pad brush.

It should be noted that reasonable performance may also be obtained even if the Tynex A and tampico bristles (18 and 19) are not evenly intermingled in each tuft unit (12) so long as the overall number and density of tuft units (12) is such that the overall dispersion of tampico bristles (19) amongst the Tynex A bristles (18) will still provide a brush face (16) of substantially evenly intermingled bristles.

While a preferred embodiment of the present invention has been described, it should be understood that various changes, adaptations, and modifications may be made therein without departing from the spirit of the invention and the scope of the appended claims.

I claim:

1. A floor maintenance brush having a circularly shaped base plate with a centrally located hole disposed axially therethrough to facilitate attachment of the brush to a floor maintenance machine, said brush having tuft units that form a substantially homogenous brush face over at least 75% of one side of said brush, said tuft units each being formed of a bundle of bristles that are bent such that both ends of each said bristle are oriented in substantially the same direction, and wherein said tuft units are each comprised of:

(a) first bristles formed of nylon and having abrasive particles impregnated therein such that the first bristles are substantially nonabsorbent and substantially abrasive; and (b) second bristles formed of tampico such that the second bristles are substantially absorbent and substantially nonabrasive, wherein said first and second bristles are fairly evenly intermingled in each said tuft unit.

*2. A floor maintenance brush having a circularly-shaped base plate with a centrally located hole disposed axially therethrough to facilitate attachment of the brush to a floor maintenance machine, said brush having tuft units disposed in tuft-receiving cavities in one side of the base plate and forming a substantially homogeneous brush face over at least 75% of one side of said brush, said tuft units each comprising:*

*(a) first bristles formed of nylon and having abrasive particles impregnated therein such that the first bristles are substantially nonabsorbent and substantially abrasive; and*

*(b) second bristles formed of tampico such that the second bristles are substantially absorbent and substantially nonabrasive; said first and second bristles being fairly evenly intermingled in each tuft unit.*

*3. A floor maintenance brush for cleaning and buffing a floor, the brush having a circularly-shaped base plate with a centrally located hole for attachment to a rotary floor maintenance machine, the baseplate having a plurality of tuft-receiving cavities formed in one side thereof, and a plurality of tuft units attached respectively in said cavities and forming a flat, substantially homogeneous brush face across the base plate, each tuft unit comprising a fairly uniformly intermingled mixture of substantially absorbent, substantially nonabrasive tampico bristles and substantially nonabsorbent, substantially abrasive nylon bristles having abrasive particles impregnated therein.*

*4. The floor maintenance brush of claim 3 wherein the tuft units include about 30% of tampico bristles and about 70% of abrasive nylon bristles.*

* * * * *